United States Patent
Tan et al.

(10) Patent No.: US 11,755,847 B2
(45) Date of Patent: Sep. 12, 2023

(54) SYSTEMS AND METHODS FOR CODE-MIXING ADVERSARIAL TRAINING

(71) Applicant: salesforce.com, inc., San Francisco, CA (US)

(72) Inventors: Samson Min Rong Tan, Singapore (SG); Shafiq Rayhan Joty, Singapore (SG)

(73) Assignee: Salesforce, Inc., San Francisco, CA (US)

(*) Notice: Subject to any disclaimer, the term of this patent is extended or adjusted under 35 U.S.C. 154(b) by 283 days.

(21) Appl. No.: 17/150,988

(22) Filed: Jan. 15, 2021

(65) Prior Publication Data

US 2022/0164547 A1    May 26, 2022

Related U.S. Application Data

(60) Provisional application No. 63/116,680, filed on Nov. 20, 2020.

(51) Int. Cl.
| | |
|---|---|
| G06F 40/45 | (2020.01) |
| G06F 40/30 | (2020.01) |
| G06F 40/289 | (2020.01) |
| G06N 3/08 | (2023.01) |

(52) U.S. Cl.
CPC ............ *G06F 40/45* (2020.01); *G06F 40/289* (2020.01); *G06F 40/30* (2020.01); *G06N 3/08* (2013.01)

(58) Field of Classification Search
CPC ........ G06F 40/45; G06F 40/289; G06F 40/30; G06F 40/58; G06F 40/40; G06N 3/08
See application file for complete search history.

(56) References Cited

U.S. PATENT DOCUMENTS

2011/0246177 A1* 10/2011 He .................... G06F 40/44 704/E11.001

OTHER PUBLICATIONS

Dong, Xin, et al. "Leveraging adversarial training in self-learning for cross-lingual text classification." Proceedings of the 43rd International ACM SIGIR Conference on Research and Development in Information Retrieval. 2020.; https://dl.acm.org/doi/pdf/10.1145/3397271.3401209 (Year: 2020).*

Wang, Xiaosen, Hao Jin, and Kun He. "Natural Language Adversarial Attack and Defense in Word Level." (2019).; https://openreview.net/attachment?id=BJl_a2VYPH&name=original_pdf (Year: 2019).*

Devarakonda, Aditya, Maxim Naumov, and Michael Garland. "Adabatch: Adaptive batch sizes for training deep neural networks." arXiv preprint arXiv:1712.02029 (2017).; https://arxiv.org/pdf/1712.02029.pdf (Year: 2017).*

(Continued)

*Primary Examiner* — Pierre Louis Desir
*Assistant Examiner* — Keisha Y. Castillo-Torres
(74) *Attorney, Agent, or Firm* — Haynes and Boone, LLP

(57) ABSTRACT

Embodiments described herein provide adversarial attacks targeting the cross-lingual generalization ability of massive multilingual representations, demonstrating their effectiveness on multilingual models for natural language inference and question answering. An efficient adversarial training scheme can thus be implemented with the adversarial attacks, which takes the same number of steps as standard supervised training and show that it encourages language-invariance in representations, thereby improving both clean and robust accuracy.

20 Claims, 10 Drawing Sheets

(56) References Cited

OTHER PUBLICATIONS

Tiedemann et al., "OPUS-MT—Building open translation services for the World," In Proceedings of the 22nd Annual Conference of the European Association for Machine Translation (EAMT), 2020, 2 pages.
Wolf et al., "Huggingface's trans-formers: State-of-the-art natural language processing," arXiv preprint arXiv:1910.03771, 2019, 11 pages.
Sabet et al., "Simalign: High quality word alignments without parallel training data using static and contextualized embeddings," arXiv preprint arXiv:2004.08728, 2020, 17 pages.
Conneau et al., "XNLI: evaluating cross-lingual sentence representations," in Proceedings of the 2018 Conference on Empirical Methods in Natural Language Processing, 2018, 12 pages.
Williams et al., "A broad-coverage challenge corpus for sentence understanding through inference," in Proceedings of the 2018 Conference of the North American Chapter of the Association for Computational Linguistics: Human Language Technologies, vol. 1 (Long Papers), 2018, 11 pages.
Rajpurkar et al., "SQuAD: 100,000+ questions for machine comprehension of text," In Proceedings of the 2016 Conference on Empirical Methods in Natural Language Processing, 2016, 10 pages.
Ganin et al., "Domain-adversarial training of neural net-works," Journal of Machine Learning Research 17(1), 2016, 35 pages.

\* cited by examiner

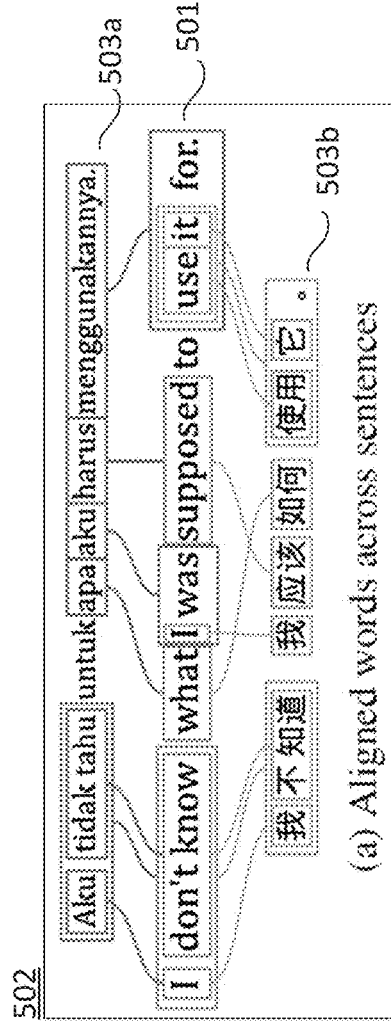
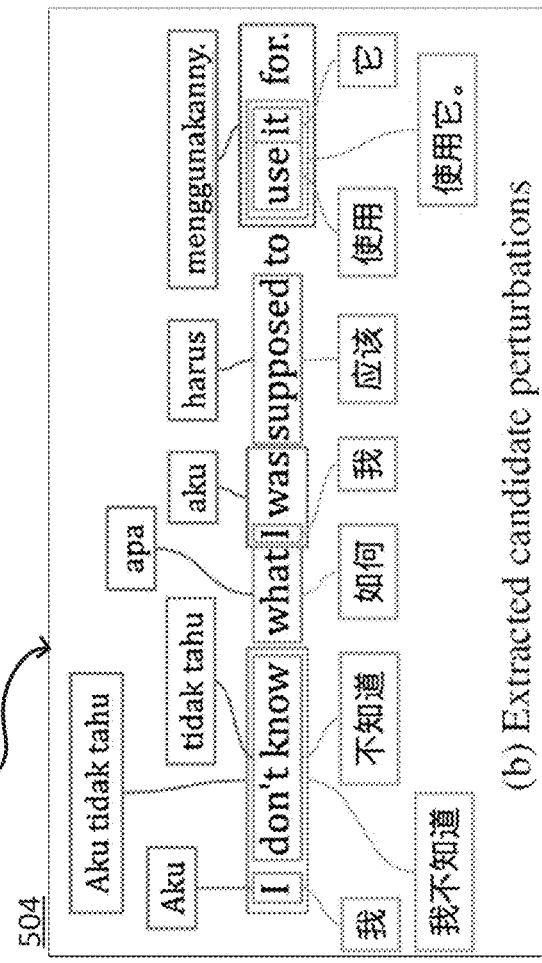
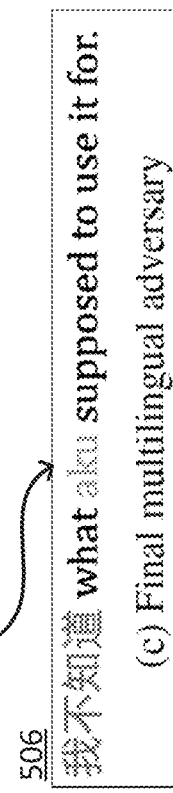
FIG. 5

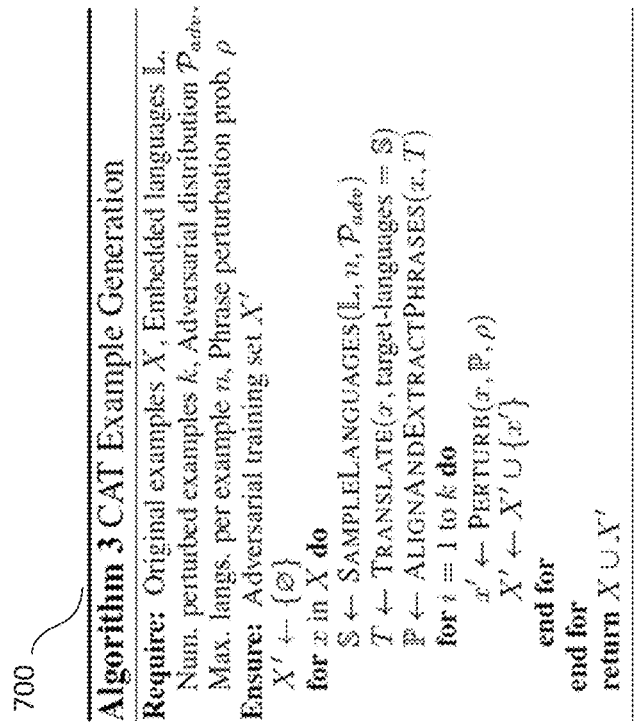

Algorithm 3 CAT Example Generation

Require: Original examples $X$, Embedded languages $L$,
Num. perturbed examples $k$, Adversarial distribution $P_{adv}$,
Max. langs. per example $n$, Phrase perturbation prob. $\rho$
Ensure: Adversarial training set $X'$
$X' \leftarrow \{\}$
for $x$ in $X$ do
    $S \leftarrow \text{SAMPLELANGUAGES}(L, n, P_{adv})$
    $T \leftarrow \text{TRANSLATE}(x, \text{target-languages} = S)$
    $P \leftarrow \text{ALIGNANDEXTRACTPHRASES}(x, T)$
    for $i = 1$ to $k$ do
        $x' \leftarrow \text{PERTURB}(x, P, \rho)$
        $X' \leftarrow X' \cup \{x'\}$
    end for
end for
return $X \cup X'$

FIG. 7A

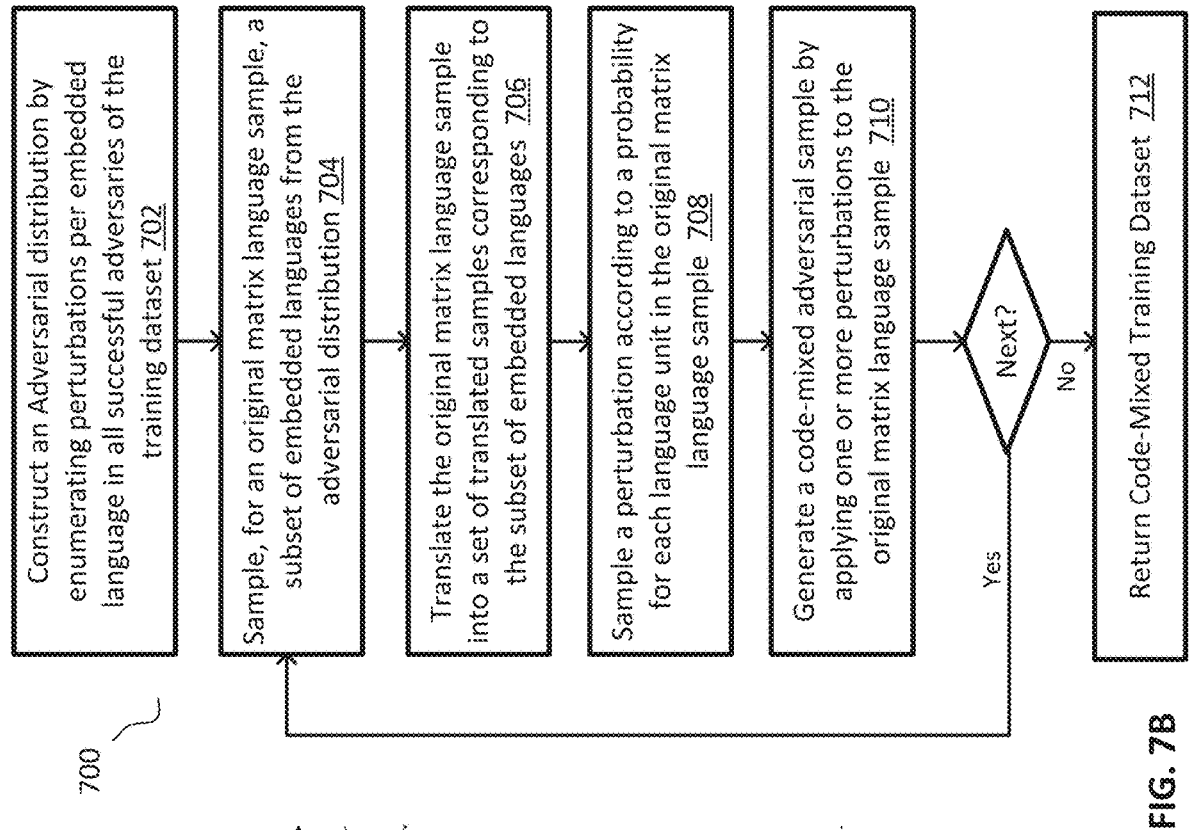

FIG. 7B

| | | |
|---|---|---|
| Original | P: | The girl that can help me is all the way across town. H: There is no one who can help me. |
| Adversary | P: | clan girl that can help me is all the way across town. H: بو حد one who can help me. |
| Prediction | | Before: Contradiction  After: Entailment |
| | | |
| Original | P: | We didn't know where they were going. H: We didn't know where the people were traveling to. |
| Adversary | P: | We didn't know where they were going. H: We didn't know where les gens allaient. |
| Prediction | | Before: Entailment  After: Neutral |
| | | |
| Original | P: | Well it got to where there's two or three aircraft arrive in a week and I didn't know where they're flying to. |
| | H: | There are never any aircraft arriving. |
| Adversary | P: | обыем, дошло то махай there's two or three aircraft arrive in a week and I didn't know where they're flying to. |
| | H: | 从来没有 aircraft arriving. |
| Prediction | | Before: Contradiction  After: Entailment |

FIG. 9

| Model | XNLI-13 (Acc.) | | | Standard XNLI (Acc.) | | | XNLI-31 (Acc.) | | |
|---|---|---|---|---|---|---|---|---|---|
| | Clean | $PG_{subt}$ | BUMBLEBEE | Clean | BUMBLEBEE | | Clean | $PG_{subt}$ | $PG_{dist}$ |
| $XLM-R_{large}$ | 81.10 | 6.06 | 28.28 | 11.31 | 79.85 | 8.18 | 80.60 | 1.87 | 8.26 |
| $XLM-R_{base}$ | 75.42 | 2.17 | 12.27 | 5.08 | 74.06 | 3.53 | 74.75 | 0.95 | 3.57 |
| $mBERT_{base}$ | 67.54 | 2.15 | 9.24 | 6.10 | 65.66 | 4.45 | 66.56 | 0.91 | 3.11 |
| $Unicoder_{base}$ | 74.98 | 1.99 | 11.33 | 4.81 | 73.69 | 3.61 | 74.28 | 0.87 | 3.73 |

FIG. 10

| Model | Clean | BUMBLEBEE |
|---|---|---|
| XLM-R$_{large}$ | 75.64 / 61.39 | 35.32 / 22.52 |
| XLM-R$_{base}$ | 68.90 / 53.50 | 17.95 / 10.33 |
| mBERT$_{base}$ | 64.66 / 49.47 | 20.66 / 11.68 |

| Condition/Method | Clean | Clean$_{BL}$ | Adv$_{SH}$ | Adv$_{SW}$ | Adv$_{BI+BT}$ | Adv$_{XNLI}$ | Adv$_{H}$ | Adv$_{H+H}$ |
|---|---|---|---|---|---|---|---|---|
| Cross-lingual transfer | 74.06 | 66.09 | 8.18 | 38.54 | 29.12 | 8.18 | 36.96 | 24.83 |
| Translate-train-n | 77.25 | 72.01 | 29.44 | 50.53 | 40.63 | 7.04 | 44.37 | 33.23 |
| DANN (Ganin et al., 2016) | 51.86 | 35.10 | 33.45 | 16.02 | 17.52 | 6.54 | 12.05 | 7.06 |
| Code-mixed adv. training (CAT) | 77.10 | 75.46 | 50.21 | 58.58 | 48.20 | 12.63 | 49.14 | 38.16 |

(a) Cross-Lingual Transfer  (b) CAT

SYSTEMS AND METHODS FOR CODE-MIXING ADVERSARIAL TRAINING

CROSS REFERENCE(S)

The present disclosure is a nonprovisional of and claims priority under 35 U.S.C. 119 to U.S. provisional application No. 63/116,680, filed on Nov. 20, 2020, which is hereby expressly incorporated by reference herein in its entirety.

TECHNICAL FIELD

The present disclosure relates generally to machine learning models and neural networks, and more specifically, to code-mixing adversarial training of multilingual models.

BACKGROUND

Multilingual models have been widely used to process inputs in different languages. Cross-lingual generalization with the advent of massive multilingual models has recently been improved to learn universal language representations. For example, models like mBERT, XLM-R, and Unicoder have demonstrated impressive zero-shot cross-lingual transfer abilities. Fine-tuning these models on task data from a high resource language such as English after pretraining them on largely monolingual corpora can usually be used to manifest such abilities.

However, transferring from one language to another is insufficient for natural language processing (NLP) systems to understand multilingual speakers in an increasingly multilingual world and multilingual societies (e.g., Singapore, Papua New Guinea, etc.). It is common for multilingual interlocutors to produce sentences by mixing words, phrases, and even grammatical structures from different languages in their repertoires, known as code-mixing. The code-mixing phenomenon is common in casual conversational environments such as social media and text messages.

Therefore, there is a need to improve NLP systems to serve multilingual communities.

BRIEF DESCRIPTION OF THE DRAWINGS

FIG. 5 is a simplified block diagram illustrating an example of generating an adversarial example using algorithm shown in FIGS. 4A-4B, according to one embodiment described herein.

FIG. 7A provides an example pseudo-code segment illustrating an example algorithm performed by the code-mixed adversarial training module to generate adversaries, and FIG. 7B provides an example logic flow diagram illustrating algorithm, according to some embodiments described herein.

FIG. 9 provides example phrase-level adversarial attack examples, according to one embodiment.

FIG. 10 provides an example table showing adversarial generation results on various XNLI test sets, according to one embodiment described herein.

Figure 1:
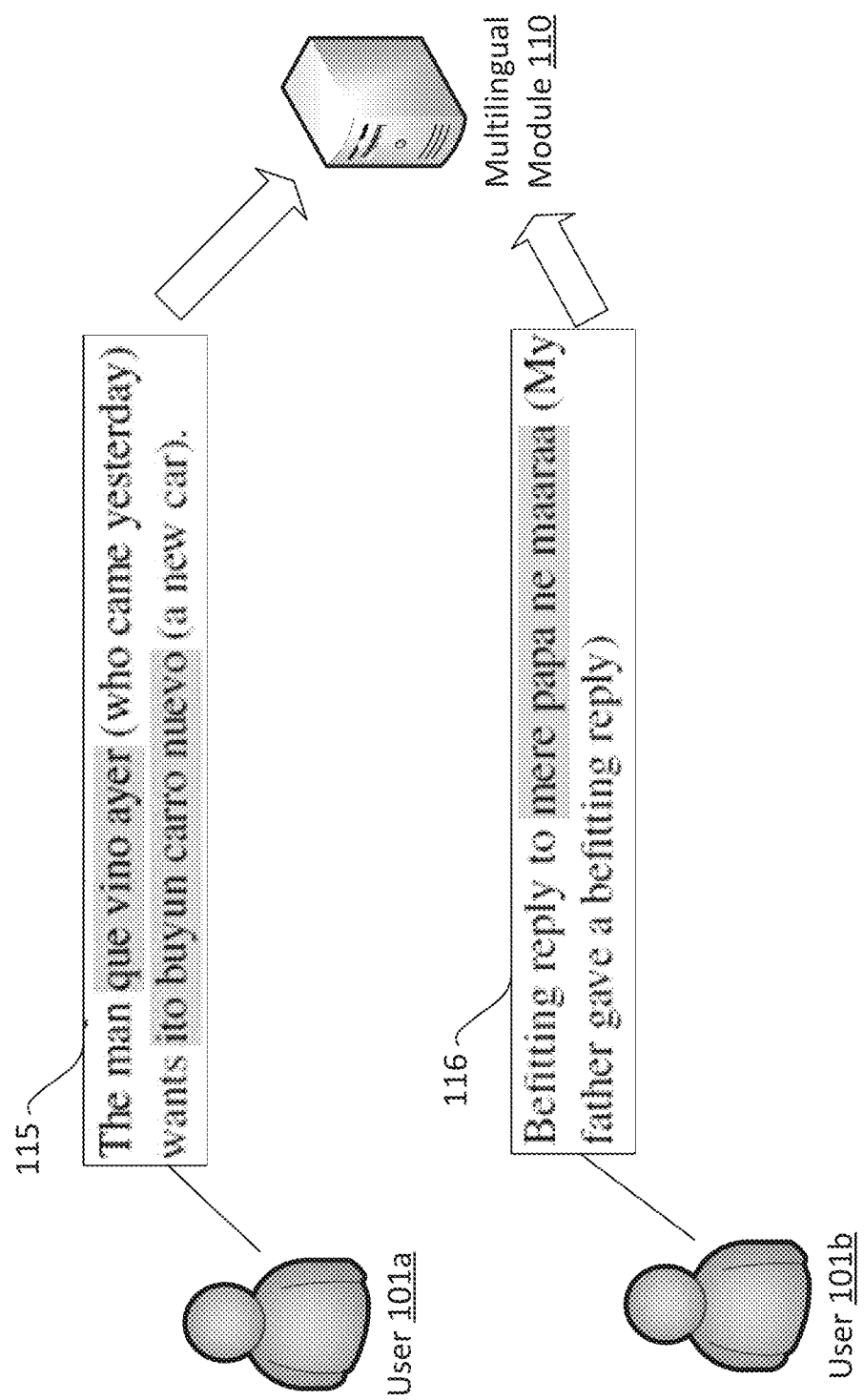
FIG. 1 is a simplified diagram showing examples of code-mixing scenarios in a multilingual environment, according to embodiments described herein.

In the figures, elements having the same designations have the same or similar functions.

DETAILED DESCRIPTION

In a multilingual society, code-mixing often takes place when a multilingual speaker produces words, and even grammatical rules, from multiple languages together in a single sentence. The code-mixing phenomenon is common in casual conversational environments such as social media and text messages. Existing evaluations for code-mixed text processing mostly focus on gold annotated data, but such datasets are (relatively) expensive to compile and face similar scarcity challenges as those for low-resource languages. Existing word/phrase-level adversarial attacks probing the limits of model robustness have largely focused on monolingual (English) inputs.

In view of the need for training multilingual models that are adopted for code-mixing in multilingual inputs, embodiments described herein provide an adversarial attack mechanism that targets the cross-lingual generalization ability of massive multilingual representations, demonstrating their effectiveness on multilingual models for natural language inference and question answering. Specifically, an adversarial attack mechanism employs worst-scenario examples to test a multilingual model, based the output of which the robustness and accuracy of the multilingual model can be evaluated. The adversarial attack mechanism can also be used to generate adversarial training examples from a training dataset of "clean" (not code-mixed) examples. The adversarial training examples can then be mixed with the original clean examples and further exampled to train the multilingual model. In this way, an efficient adversarial training scheme can thus be implemented with the adversarial attacks, which takes the same number of steps as standard supervised training and show that it encourages language-invariance in representations, thereby improving both clean and robust accuracy.

For example, two multi-lingual adversarial attacks that adopt the persona of an adversarial code-mixer are generated, which generate adversarial attacks on the word-level and the phrase-level, respectively. The generation focuses on the lexical component of code-mixing, where some words in a sentence are substituted with their equivalents from another language in the interlocutor's repertoire. In this way, the generated adversarial attacks may be used to test how robust the multilingual models react to code-mixing inputs, e.g., English/Chinese mixed, French/German mixed, etc.

Furthermore, in view of the need to improve multilingual models that are configured to perform downstream tasks in a multilingual environment, a code-mixed adversarial training (CAT) mechanism is introduced to improve the robustness of multilingual models to adversarial polyglots. Specifically, a CAT training dataset is generated by enumerating the perturbation per embedded language in all successful adversaries of original training examples, where the adversaries are generated by word-level or the phrase-level perturbation. While the CAT training dataset has a much larger size than an original training set, training is performed by sampling the same number of examples from the CAT training dataset with the original training set. In this way, the model is exposed to more variation of adversarial training examples in the same number of training steps and thus training robustness can be improved.

As used herein, the term "word" is referred to a basic language unit in language. For example, in the English language, a "word" usually appear in the form of a short sequence of letters, and "words" are usually separated by spaces within a sentence. For another example, in an East Asian language such as Chinese or Korean, a "word" refers to a character.

As user herein, the term "phrase" is referred to sequence of words that have a designated meaning when recited as the sequence of words. For example, the sequence of English words such as "on top of," "to the left of," "within the bounds of," etc., is a phrase. For another example, a phrase in an East Asian language often contains a few characters.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Adversarial Attack Generation

FIG. 1 is a simplified diagram showing examples of code-mixing scenarios in a multilingual environment, according to embodiments described herein. Code-mixing is a phenomenon where a multilingual speaker mixes words, and even grammatical rules, from different languages in a single sentence. For example, user 101a may mix both English and Spanish words or phrases in his or her utterance 115 and feed the input utterance 115 to a multilingual module 110. In another example, user 101b may mix both English and Hindi words or phrases in his or her utterance 116 and feed the input utterance 116 to the multilingual module 110. Thus, the multilingual module 110 receives and processes code-mixed inputs 115 and 116 for downstream tasks, such as but not limited to generation a response, performing a purchase task, and/or the like.

Therefore, the cross-lingual transfer ability of the multilingual module 110 may be important to monitor. Some existing evaluations for code-mixed text processing focus on gold annotated data, but such datasets are (relatively) expensive to compile and face similar scarcity challenges as those for low-resource languages. Other existing word-/phrase-level adversarial attacks probing the limits of model robustness have largely focused on monolingual (English) inputs. As further described in FIG. 2, adversarial attacks may be designed to test the robustness of multilingual models 110 to adversarial code-mixers with generated adversarial attack examples.

Figure 2:
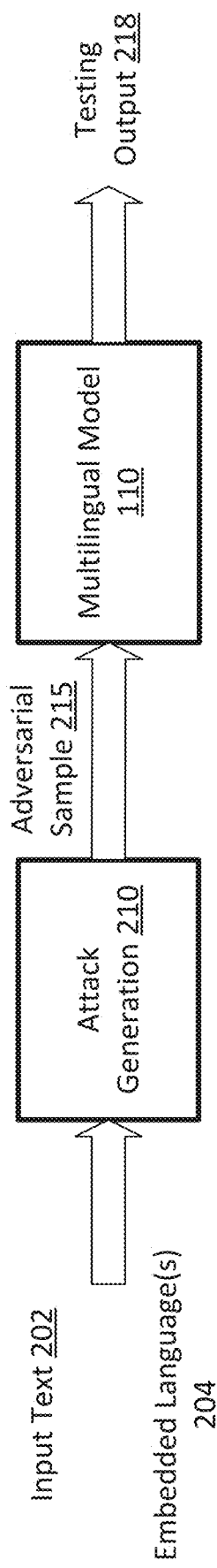
FIG. 2 is a simplified diagram showing an example mechanism of testing the multilingual model with adversarial attacks, according to some embodiments described herein.

FIG. 2 is a simplified diagram showing an example mechanism of testing the multilingual model 110 with adversarial attacks, according to some embodiments described herein. An attack generation module 210 may generate multi-lingual adversarial attacks that adopt the persona of an adversarial code-mixer, e.g., sentences are substituted with their equivalents from another language in the interlocutor's repertoire; and borrowed words fall into two categories, nonce borrowing and loanwords. For example, an input text 202 in its original language (e.g., English) and a set of embedded languages 204 (target languages to borrow words from) may be input to the attack generation module 210, which may in turn generate one or more adversarial examples 215.

For example, the attack generation module 210 may employ the target multilingual model $\mathcal{M}$ 110, a clean example x with the label y (input text 202), and a set of embedded languages $\mathbb{L}$ (204) from which to borrow words, to generate the adversarial example x' (215) that maximizes $\mathcal{M}$'s loss. The problem may be represented as:

$$x' = \operatorname*{argmax}_{x_c \in X} \mathcal{L}(y, \mathcal{M}(x_c)),$$

where $x_c \in X$ is a candidate adversary generated by perturbing x, $\mathcal{M}$ is a task-specific neural model, and $\mathcal{L}(.)$ is the model's function. For example, $\mathcal{L}(.)$ may be the cross-entropy loss function.

It is worth noting that most code-mixers may be bilinguals, natural code-mixed sentences tend to be constructed from two languages, with one language determining the syntax of the overall sentence. However, in a world with an increasing number of multilingual societies, embodiments described herein is applicable to code-mixing that occurs between more than two languages.

Figures 3A, 3B:
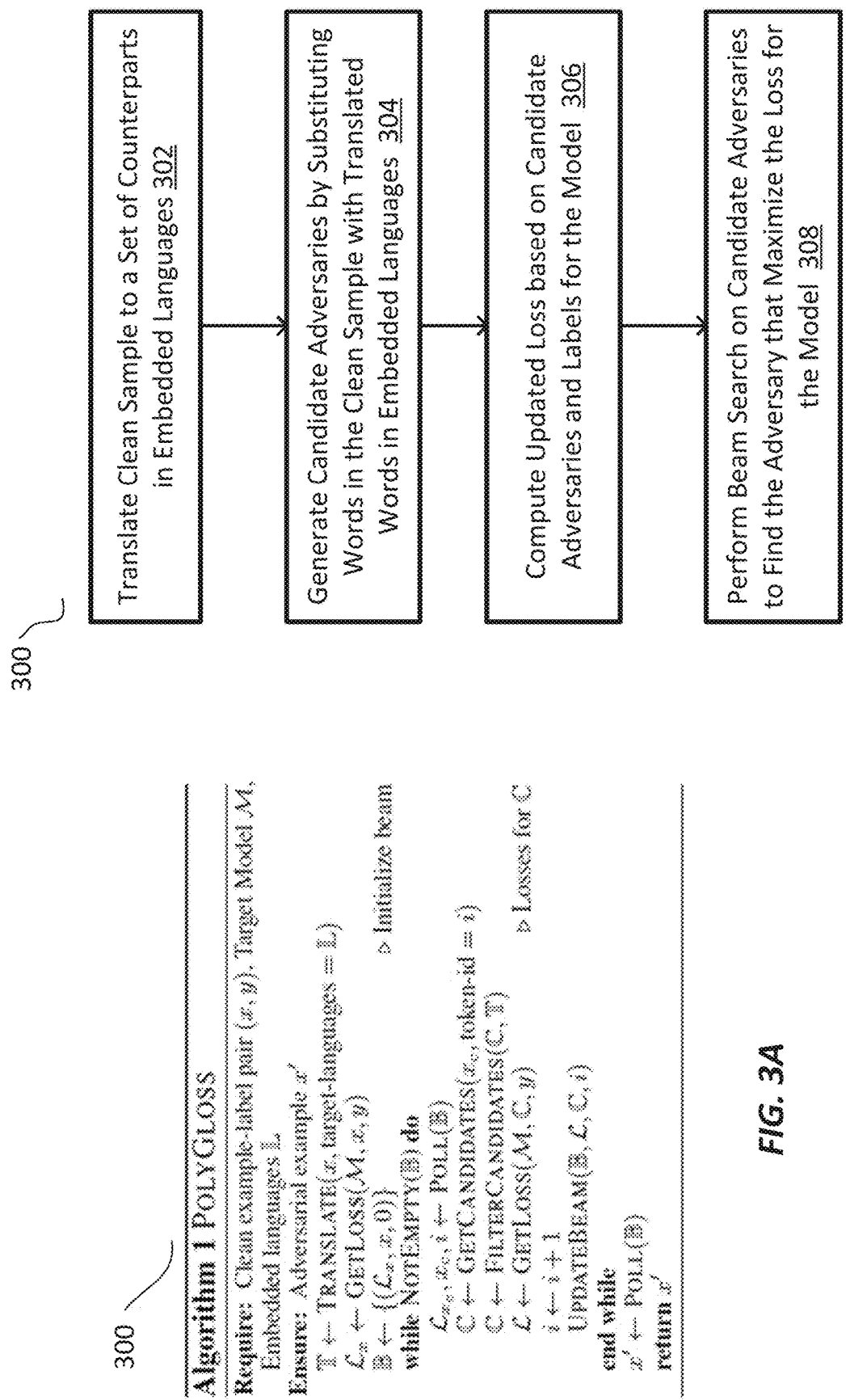
FIG. 3A provides an example pseudo-code segment illustrating an example algorithm performed by the attack generation module to generate word-level adversaries, and FIG. 3B provides an example logic flow diagram illustrating algorithm, according to some embodiments described herein.

FIG. 3A provides an example pseudo-code segment illustrating an example algorithm 300 performed by the attack generation module 210 to generate word-level adversaries, and FIG. 3B provides an example logic flow diagram illustrating algorithm 300, according to some embodiments described herein. One or more of the processes 302-308 of algorithm 300 may be implemented, at least in part, in the form of executable code stored on non-transitory, tangible, machine-readable media that when run by one or more processors may cause the one or more processors to perform one or more of the processes 302-308. In some embodiments, method 300 may correspond to the method used by the module 210 in FIG. 2 or module 831 in FIG. 8.

As used herein, the original example's language is referred to as the matrix language and the perturbation's language (target language) is referred to as the embedded language.

Specifically, algorithm 300, referred to as "PolyGloss," starts with the clean example pair (x, y), the target model $\mathcal{M}$, and a set of embedded languages $\mathbb{L}$. First, at step 302, algorithm 300 translates the original example x to a set $\mathbb{T}$ of counterparts in different embedded languages. A loss function $\mathcal{L}_x$ may be computed based on the output in response to the input example x to the model $\mathcal{M}$ and the label y. A beam search $\mathbb{B}$ may then be initialized based on the input clean example x, and the initial loss function $\mathcal{L}_x$.

At step 304, a set $\mathbb{C}$ of candidate adversaries may then be generated by substituting words in the clean example x with their equivalents from another language. These substitutions/perturbations may be generated by via machine translation or mined from bilingual dictionaries. At step 306, an updated loss $\mathcal{L}$ may be computed based on candidates from the set $\mathbb{C}$ and the label y. At step 308, beam search may then be performed on the candidates $\mathbb{C}$ to find the adversary that maximizes the target model's loss $\mathcal{L}$ in a black-box manner. In one implementation, successful adversaries with the highest and lowest losses may be tracked. The former is a stronger adversary, while the latter often has fewer perturbations. In this way, the adversaries with the highest loss may be returned as the adversarial example x'.

In one implementation, algorithm 300 may be implemented with cross-lingual dictionaries released by Lample et al., XNLI: Evaluating cross-lingual sentence representations, in Proceedings of the 2018 Conference on Empirical Methods in Natural Language Processing, pp. 2475-2485, 2018, for generating candidate perturbations instead of translating the words in an online fashion. Gold translations of the clean examples may also be used when they are available (such as in XNLI), and the models released by Tiedemann et al., OPUS-MT—Building open translation services for the World. In Proceedings of the 22nd Annual Conference of the European Association for Machine Translation (EAMT), 2020. Transformers library described in Wolf et al., Huggingface's trans-formers: State-of-the-art natural language processing, arXiv preprint arXiv: 1910.03771, 2019, may also be employed to translate the examples to other languages, and cached in hashtables for fast retrieval.

When the embedded language uses a different script from the matrix language, code-mixers tend to transliterate borrowed words into the same script, which may pose a significant challenge to multilingual models. However, in one implementation, as there is often no standard way of transliterating words, the embedded language's script is preserved where possible to avoid unfairly penalizing the target model.

Due to the polysemous nature of many words, translating the right sense is crucial to preserving the word's (and sentence's) semantics. Some existing word sense disambiguation methods use sense tagger trained on an annotated sense inventory such as WordNet. However, this approach requires individual taggers and sense inventories for each matrix and embedded language, making it a challenge to extend algorithm 300 to low-resource languages.

Thus, in one embodiment, candidate perturbations may be filtered using the embedded language translation of the clean example. This may be accomplished by checking if a particular candidate perturbation exists in the translated version of the entire clean example in a corresponding embedded language. If the particular candidate perturbation can be found, the particular candidate perturbation is deemed usable; otherwise, the particular candidate perturbation may be discarded as inaccurate.

As the examples tend to be single sentences, the probability of different senses of the same word occurring in a single sentence is generally low. This approach only requires a machine translation system and no extra linguistic information, making it highly scalable as long as a supervised (or unsupervised) machine translation system is available. By using gold translations instead of machine translations, semantic preservation at the word-level can be largely improved.

Figures 4A, 4B:
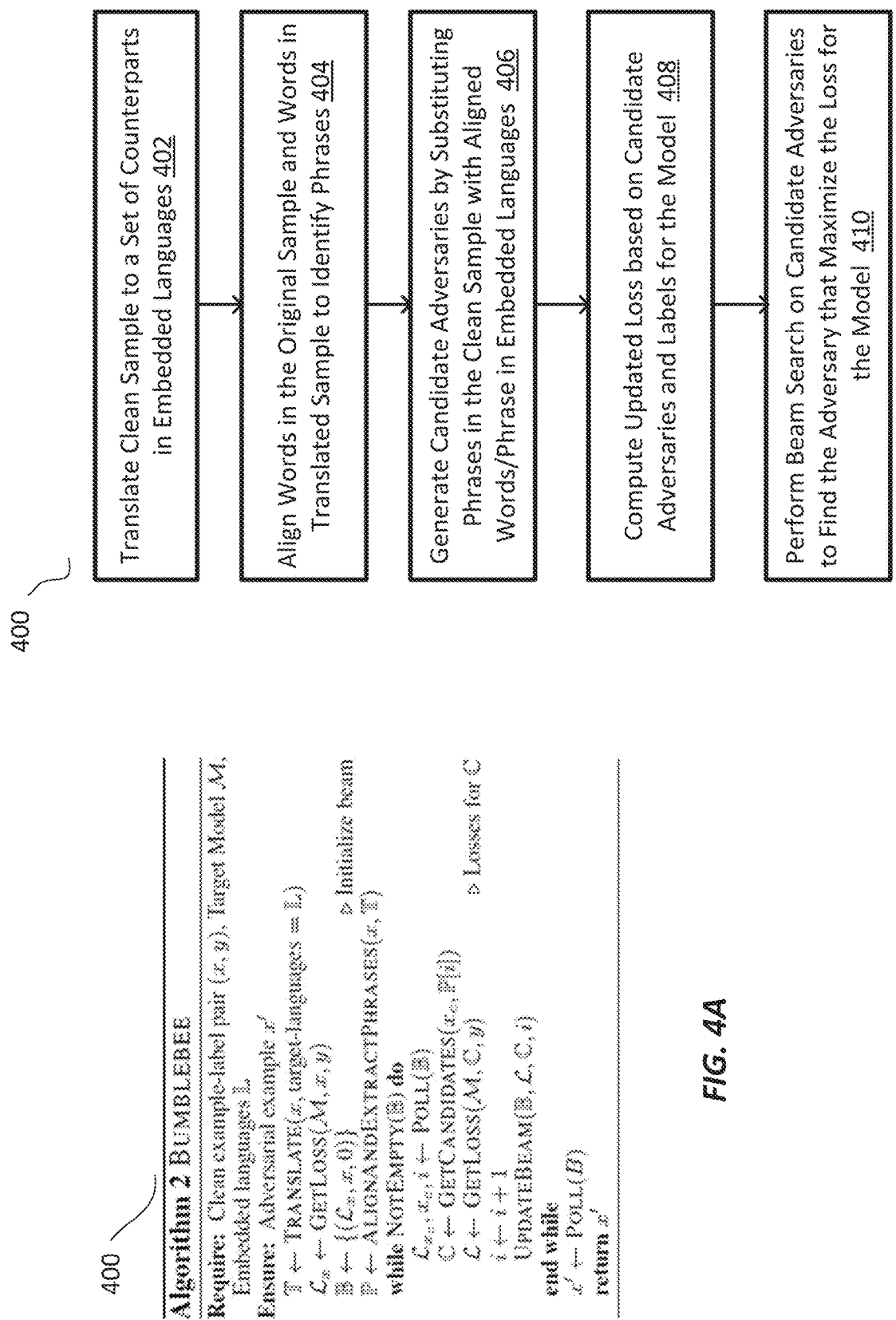
FIG. 4A provides an example pseudo-code segment illustrating an example algorithm performed by the attack generation module to generate phrase-level adversaries, and FIG. 4B provides an example logic flow diagram illustrating algorithm, according to some embodiments described herein.

FIG. 4A provides an example pseudo-code segment illustrating an example algorithm 400 performed by the attack generation module 210 to generate phrase-level adversaries, and FIG. 4B provides an example logic flow diagram illustrating algorithm 400, according to some embodiments described herein. One or more of the processes 402-408 of algorithm 400 may be implemented, at least in part, in the form of executable code stored on non-transitory, tangible, machine-readable media that when run by one or more processors may cause the one or more processors to perform one or more of the processes 402-410. In some embodiments, method 300 may correspond to the method used by the module 210 in FIG. 2 or module 831 in FIG. 8.

In one embodiment, using bilingual dictionaries with the filtering method may provide that the semantics of a borrowed word matches the original. But then the presence of sufficient candidate adversaries may largely rely on the dictionary's comprehensiveness. In addition, swapping words at the word level may hurt the sentence pattern or construction of the resulting sentence as it is more common for code-mixers to borrow phrases than individual words. Therefore, algorithm 400 (referred to as "BumbleBee" throughout this disclosure) replaces phrases in the matrix sentence with their equivalents from the reference translations instead of using a dictionary lookup by algorithm 300.

Specifically, algorithm 400 starts with the clean example pair (x, y), the target model $\mathcal{M}$, and a set of embedded languages $\mathbb{L}$. At step 402, algorithm 400 translates the original example x to a set $\mathbb{T}$ of counterparts in different embedded languages. A loss function $\mathcal{L}_x$ may be computed based on the output in response to the input example x to the model $\mathcal{M}$ and the label y. A beam search $\mathbb{B}$ may then be initialized based on the input clean example x, and the initial loss function $\mathcal{L}_x$.

At step 404, words from the original clean example and words from a translated example are aligned such that combinations of words are identified as phrases $\mathbb{P}$ during the alignment.

At step 406, a set $\mathbb{C}$ of candidate adversaries may then be generated by substituting aligned words or phrases in the clean example x with the aligned words or phrases from another language. At step 408, an updated loss $\mathcal{L}$ may then be computed based on candidates from the set $\mathbb{C}$ and the label y. At step 410, beam search may then be performed on the candidates $\mathbb{C}$ to find the adversary that maximizes the target model's loss $\mathcal{L}$ in a black-box manner. For example, the adversaries with the highest loss may be returned as the adversarial example x'.

For example, in one implementation, algorithm 400 may be implemented by the gold translations where available and the translation models in Tiedemann et al. may be used for the other languages and align sentences with a neural word aligner backed by XLM-Rbase. Specifically, the neural word aligner employs the high recall ("Match") algorithm for candidate generation, instead of the Itermax algorithm described in the aligner used in Sabet et al., Simalign: High quality word alignments without parallel training data using static and contextualized embeddings. arXiv preprint arXiv: 2004.08728, 2020.

One advantage of algorithm 400 is the flexibility and scalability to more languages because algorithm 400 only requires parallel bitexts from the matrix and embedded languages. With the advent of neural sequence-to-sequence models, such bitexts can be easily generated using publicly available machine translation models. However, one possible challenge of this approach is extracting the matrix-embedded phrase pairs from the clean example and its translation. In one implementation, phrase-based machine translation methods may be applied, which may be accomplished by aligning the matrix and embedded sentences.

In one embodiment, to improve the adversaries' naturalness, an equivalence constraint may be imposed, preventing a perturbation from being applied if the perturbation is from the same language as the previous word and will disrupt the syntax of the current phrase if applied. Such disruptions usually occur when borrowing words from languages with a different word order.

FIG. 5 is a simplified block diagram illustrating an example of generating an adversarial example using algorithm 400 shown in FIGS. 4A-4B, according to one embodiment described herein. Block 502 shows the original input example 501 in English, "I don't know what I was supposed to use it for," which is translated into an Indonesian counterpart 503a and a Chinese counterpart 503b. Words in the original example 501 and translated examples 503a-b are aligned. Phrases that contain more than one word, such as "don't know," "use it for," may be identified through the alignment.

Block 504 shows that candidate perturbations may be extracted from the translated (embedded) sentences. Block 506 shows the final multilingual adversary, in which the original example has been perturbed with Chinese and Indonesian words or phrases. The particular candidate perturbation maximizes the target model's loss among other candidate perturbations shown in block 504.

Code-Mixed Adversarial Training

Figure 6:
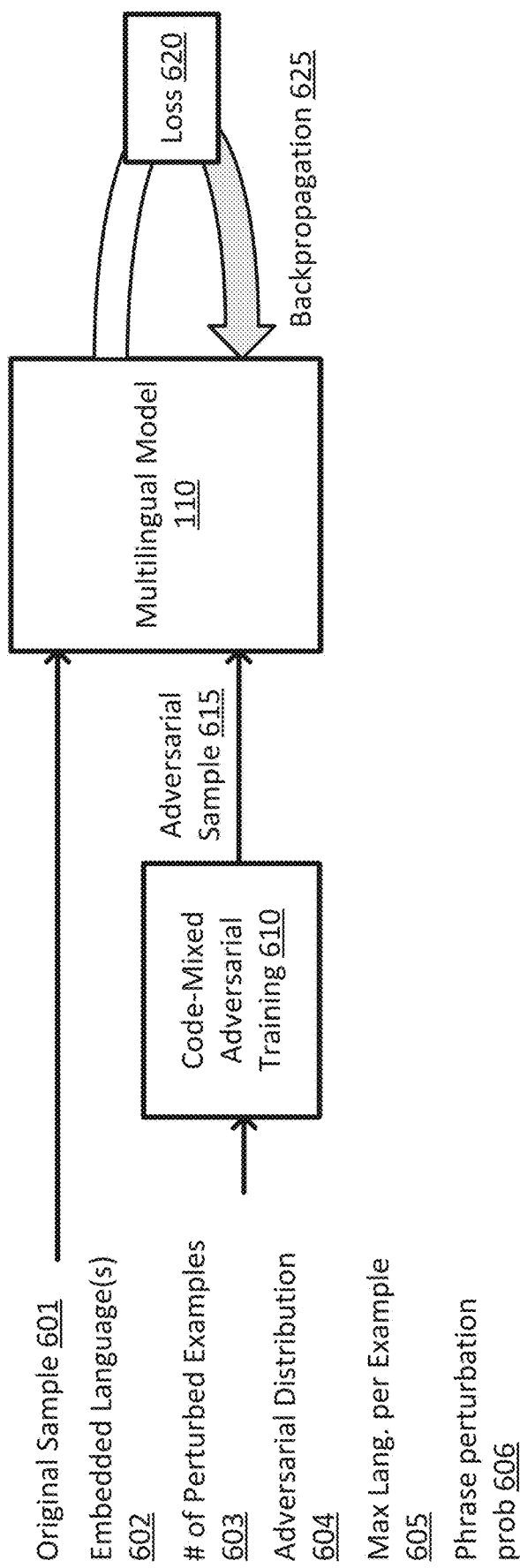
FIG. 6 is a simplified block diagram illustrating an example aspect of code-mixed adversarial training of the multilingual model, according to embodiments described herein.

FIG. 6 is a simplified block diagram illustrating an example aspect of code-mixed adversarial training of the multilingual model 110, according to embodiments described herein. Traditionally, in adversarial training, adversarial attacks are run on the training set to generate adversaries for training. However, this makes adversarial training computationally expensive as the code-mixed training dataset combining the original training examples and the generated adversarial training examples has a much larger size than the original training dataset. Hence, to avoid the training dataset size expansion, perturbations may be randomly exampled from an adversarial distribution to generate code-mixed perturbations using word alignment.

Specifically, a code-mixed adversarial training module 610 may receive training data such as an original training example x 601, a set of embedded languages $\mathbb{L}$ 602, the number of perturbed examples 603, an adversarial distribution $P_{adv}$ 604, the maximum number of languages per each example 605, the phrase perturbation probability 606, and/or the like. For example, the original training example x 601 may be in English. The number of perturbed examples 603 may define the numbers of adversarial examples to be generated in the code-mixed adversarial training set X'. The adversarial distribution $P_{adv}$ 604 denotes the sampling probability to example embedded languages out of the set $\mathbb{L}$. The phrase perturbation probability 606 denotes the probability that a phrase in an original example is to be swapped with a translated version of an embedded language during adversary generation.

The code-mixed adversarial training module 610 may then generate a code-mixed adversarial training dataset X' which comprises both the generated adversarial example 615 and the original example 601, based on the inputs 601-606. The code-mixed adversarial training dataset X' is then input to the multilingual model 110, whose output in response to the input may be used to compute a loss 620 (e.g., cross-entropy loss) to update the multilingual model 110 via the backpropagation path 625.

FIG. 7A provides an example pseudo-code segment illustrating an example algorithm 700 performed by the code-mixed adversarial training module 610 to generate adversaries 615, and FIG. 7B provides an example logic flow diagram illustrating algorithm 700, according to some embodiments described herein. One or more of the processes 702-708 of algorithm 700 may be implemented, at least in part, in the form of executable code stored on non-transitory, tangible, machine-readable media that when run by one or more processors may cause the one or more processors to perform one or more of the processes 702-710. In some embodiments, method 700 may correspond to the method used by the module 610 in FIG. 6 or module 832 in FIG. 8.

Method 700 may start with receiving a training dataset X of original matrix language examples and a set $\mathbb{L}$ of embedded languages. Each original matrix language example x in the training dataset X corresponds with a respective label y. At step 702, an adversarial distribution is constructed by enumerating perturbations per embedded language in all successful adversaries of the training dataset. For example, the adversarial distribution $P_{adv}$ 604 may be computed by enumerating the perturbations per embedded language in all successful adversaries. For example, $\mathcal{P}_{adv}=\{f_i\}_{i=1,\ldots,|\mathbb{L}|}$, where $$f_i = \frac{l_i}{\sum_{j=1}^{|\mathbb{L}|} l_j},$$

and $l_i$ refers to the number of perturbations in the particular ith language and $f_i$ denotes the normalized count.

At step 704, method 700 may example, for an original matrix language example, a subset of embedded languages from the adversarial distribution. For example, for each clean example x, n languages are exampled from the set $\mathbb{L}$ of embedded languages according to $\mathcal{P}_{adv}$.

At step 706, the original matrix language example may be translated into a set of translated examples corresponding to the subset of embedded languages. For example, the original example x may then be translated into the n languages, and the n translated examples are then aligned with the original example x. In one implementation, for sentence-pair classification tasks, each input sentence is translated into n languages, where the number n may vary per sentence, to further increase variation. For example, limiting n would improve the generated training example's naturalness and the algorithm's efficiency (the alignment is the most costly step), as the greater n is, the more translated versions of the example and thus more alignment processing is to be handled.

At step 708, method 700 may example a perturbation according to a probability for each language unit in the original matrix language example. The language unit may be a phrase in the original matrix language example. For example, phrases are then extracted from the aligned sentences (e.g., similar to step 404 in FIG. 4B), yielding the candidate perturbations $\mathbb{P}$. Next, a perturbation is exampled according to the probability p from the candidate perturbations $\mathbb{P}$ for each phrase in the original example x. Reducing the probability p yields more natural sentences as the original example will be less perturbed.

At step 710, a code-mixed adversarial example x' is generated by applying one or more perturbations to the original matrix language example. Method 700 may then repeat steps 704-710 may be repeated for k times for each original example x in the training dataset X such that each original example x generates k versions of code-mixed adversarial examples x' to obtain the code-mixed training dataset X'.

At step 712, a code-mixed training dataset may be returned by combining the generated code-mixed adversarial examples x' and the original examples x. The combined training dataset has all the examples (including original examples x and adversarial examples x') mixed and shuffled. In this way, the multilingual model may then be trained based on combined training dataset, e.g., the training input may be the generated code-mixed adversarial example or the original example and a respective label corresponding to the original matrix language example.

In contrast to running the adversarial attack on the training set, sampling perturbations from a distribution may not guarantee that the resulting example will be adversarial to the model, e.g., perturbations may not be generated for an original example due to probability. This issue can be mitigated by increasing the number of code-mixed adversarial examples observed during training. However, this may increase the computational cost if the multilingual model is trained for the same number of epochs, each epoch equals one pass of the entire training dataset, which includes a number e of backpropagation training steps depending on the batch size. Thus, supposedly if the multilingual model was to be trained on the original dataset X for a number of m epochs, a total number of m×e backpropagation steps. With the combined code-mixed training dataset XUX' is used to train the multilingual model, if the same number of m epochs are to be used, a total number of m×e x(k+1) backpropagation steps would be experienced, which may increase the computational cost. Hence, in order not to increase the backpropagation steps in training, the iteration number k is set to be one epoch less than the supposed total number of epochs XLM-Rbase was fine-tuned, e.g., (m−1), and the multilingual model is then trained on the code-mixed training set XUX' for one epoch. In this way, the multilingual model is trained for exactly the same number m×e of backpropagation steps without incurring significant added computational cost, but has been exposed to more variation in code-mixed examples.

Computer Environment

Figure 8:
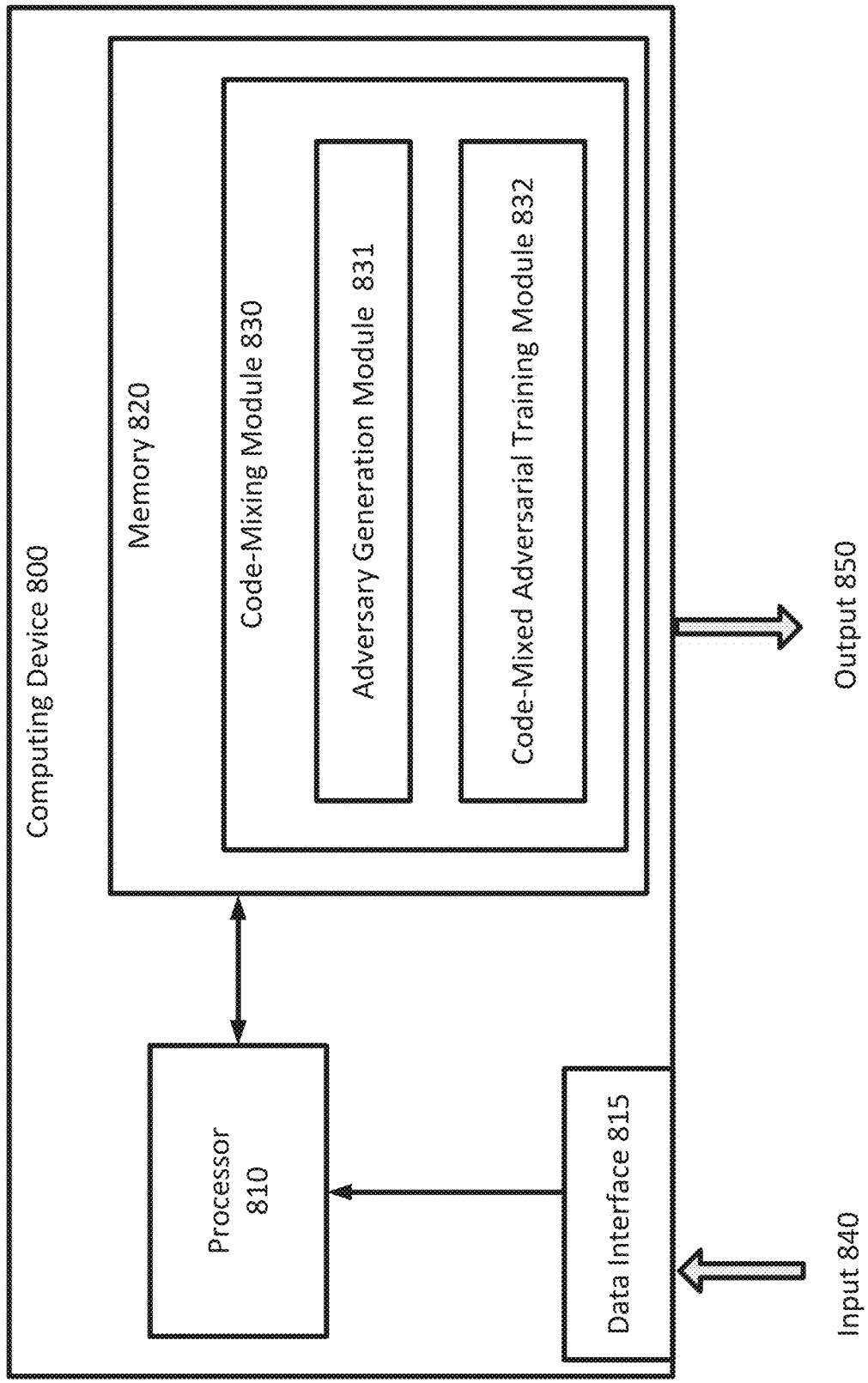
FIG. 8 is a simplified diagram of a computing device for code-mixed adversarial training using generated multilingual adversaries, according to some embodiments.

FIG. 8 is a simplified diagram of a computing device for code-mixed adversarial training using generated multilingual adversaries, according to some embodiments. As shown in FIG. 8, computing device 800 includes a processor 810 coupled to memory 820. Operation of computing device 800 is controlled by processor 810. And although computing device 800 is shown with only one processor 810, it is understood that processor 810 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 800. Computing device 800 may be implemented as a stand-alone subsystem, as a board added to a computing device, and/or as a virtual machine.

Memory 820 may be used to store software executed by computing device 800 and/or one or more data structures used during operation of computing device 800. Memory 820 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 810 and/or memory 820 may be arranged in any suitable physical arrangement. In some embodiments, processor 810 and/or memory 820 may be implemented on a same board, in a same package (e.g., system-in-package), on a same chip (e.g., system-on-chip), and/or the like. In some embodiments, processor 810 and/or memory 820 may include distributed, virtualized, and/or containerized computing resources. Consistent with such embodiments, processor 810 and/or memory 820 may be located in one or more data centers and/or cloud computing facilities.

In some examples, memory 820 may include non-transitory, tangible, machine readable media that includes executable code that when run by one or more processors (e.g., processor 810) may cause the one or more processors to perform the methods described in further detail herein. For example, as shown, memory 820 includes instructions for a code-mixing module 830 that may be used to implement and/or emulate the systems and models, and/or to implement any of the methods described further herein. In some examples, the code-mixing module 830, may receive an input 840, e.g., such as a training dataset of target languages, via a data interface 815. The data interface 815 may be any of a user interface that receives a user uploaded language examples, or a communication interface that may receive or retrieve a previously stored language examples from the database. The code-mixing module 830 may generate an output 850 such as classification, an answer to question, a response to utterance, etc. of the input 840.

In some embodiments, the code-mixing module 830 may further includes the adversary generation module 831 and a code-mixed adversarial training module 832. For example, the adversary generation module 831 may perform functions similar to the attack generation module 210 in FIG. 2, and the code-mixed adversarial training module 832 may be similar to module 610 in FIG. 6. In some examples, the code-mixing module 830 and the sub-modules 831-832 may be implemented using hardware, software, and/or a combination of hardware and software.

Some examples of computing devices, such as computing device 800 may include non-transitory, tangible, machine readable media that include executable code that when run by one or more processors (e.g., processor 810) may cause the one or more processors to perform the processes of methods 300, 400 and 700. Some common forms of machine readable media that may include the processes of methods 300, 400 and 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Performance

The word-level and phrase-level adversarial example generation algorithms/methods 300 and 400 are evaluated on the XNLI dataset (described in Conneau et al., XNLI: evaluating cross-lingual sentence representations, in Proceedings of the 2018 Conference on Empirical Methods in Natural Language Processing, pages 2475-2485, 2018). A stronger attack is evaluated on the XQuAD dataset. XNLI is a multilingual dataset for natural language inference (NLI) with parallel translations for each example in fifteen languages. Each example comprises a premise, hypothesis, and a label with three possible classes: {contradiction, neutral, entailment}. Two more datasets are constructed from XNLI: XNLI-13 and XNLI-32. XNLI-13 comprises all XNLI languages except Swahili and Urdu due to the lack of suitable dictionaries for POLYGLOSS (method 300). The English test set is then translated into eighteen other languages with machine translation systems to form XNLI-31, increasing the number of embedded languages POLYGLOSS can draw from. XQuAD is a multi-lingual dataset for extractive question answering (QA) with parallel translations in eleven languages. In the cross-lingual transfer setting, the models are trained on English data, MNLI (Williams et al., A broad-coverage challenge corpus for sentence understanding through inference, in Proceedings of the 2018 Conference of the North American Chapter of the Association for Computational Linguistics: Human Language Technologies, Volume 1 (Long Papers), pages 1112-1122, 2018) and SQuAD 1.1 (Rajpurkar et al., SQuAD: 100,000+ questions for machine comprehension of text. In Proceedings of the 2016 Conference on Empirical Methods in Natural Language Processing, pages 2383-2392, 2016), and tested on multilingual data, XNLI and XQuAD, respectively. The premise and hypothesis are then perturbed for NLI and only the question for QA.

Although the attacks work with any language as the matrix language, English is used as the matrix language due to the availability of English translation models and the prevalence of English as the matrix language in many code-mixing societies. The multilingual models used for the test includes XLM-RoBERTa, mBERT, and Unicoder, each pretrained on more than 100 languages.

FIG. 9 provides example phrase-level adversarial attack examples, according to one embodiment. As shown in FIG. 9, the original examples in English may be perturbed and mixed with Arabian, French, Russian and Chinese phrases. After the code-mixing attacks, the prediction result from the multilingual model under attack generally differs from the original prediction in response to the original English example.

Further, existing systems may experience significant performance drops in XNLI accuracy for mBERT when the premise and hypothesis were in different languages, theorizing this to be an effect of disrupting the model's reliance on lexical overlap. FIG. 9 shows multiple examples where the prediction was flipped from "contradiction" to "entailment" simply by perturbing a few words. If the models did not rely on lexical overlap but performed comparisons at the semantic level, such perturbations should not have severely impacted their performance. Thus, results shown in FIG. 9 on QA corroborate that models trained on SQuAD-style datasets exploit lexical overlap between the question and context.

FIG. 10 provides an example table showing adversarial generation results on various XNLI test sets, according to one embodiment described herein. From FIG. 10, it is observed that all the models are significantly challenged by adversarial code-mixing, though XLM-Rlarge is the most robust to both attacks, likely due to having more parameters. However, even after filtering POLYGLOSS's candidate perturbations by the gold translations in XNLI-13, an average drop is observed in accuracy of 80.01%, relative to the models' accuracy on the clean XNLI-13. BUMBLEBEE induces even greater performance drops (average relative decrease of 90.96% on XNLI-13), likely due to its word aligner yielding more candidates than POLYGLOSS's dictionary lookup. Increasing the number of embedded languages POLYGLOSS can draw upon results in greater drops in model performance (average relative decrease in accuracy of 93.66% on XNLI-31).

It is further noticed that mBERT is more sensitive to intra-phrasal syntactic disruption than the XLM-based models. mBERT is the most robust to BUMBLEBEE out of all the base models when the equivalence constraint is in place yet is the least robust to POLYGLOSS. However, the latter trend is replicated for BUMBLEBEE if remove this constraint is removed. A possible explanation is that XLM-R and Unicoder were trained on monolingual CommonCrawl (CC) data, while mBERT was trained on multilingual Wikipedia, which could be considered as aligned at the article level since there are articles on the same topic in different languages. Hence, it is possible that this helped to align the languages more accurately in the feature space but made it more sensitive to syntactic disruptions. The higher performance of the XLM-based models on clean data can likely be attributed to the CC corpus being an order of magnitude larger.

In the unfiltered setting, it is impossible for POLYGLOSS to discriminate be-tween valid and invalid senses for a given context. Hence, a potential criticism is that the large difference in POLYGLOSS's success rate between the filtered and unfiltered settings could be attributed to the inappropriate senses of polysemous words being chosen and disrupting the semantics of the sentence. On the other hand, filtering perturbations with reference translations of the sentence shrinks the space of perturbations to ~1 per language. Due to the dictionaries' non-exhaustive nature, not every word in the matrix sentence has an entry in the dictionary to begin with, making this filtering step a significant reduction of the space of candidates.

To determine the likely cause of the accuracy difference between the filtered and unfiltered settings in XNLI-13, the number of languages available to POLYGLOSS is increased to thirty-one. If the difference between the filtered and unfiltered settings were not due to a lack of sufficient candidates, only a minor difference should be observed between the filtered settings for both XNLI-13 and -31. However, a 69% drop for XLM-Rlarge occurs, indicating that the former accuracy difference is likely due to the reduced number of valid candidates.

Figures 11, 12, 13:
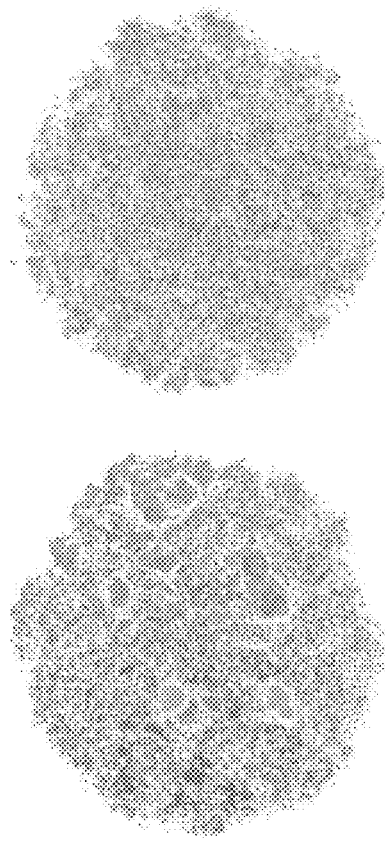
FIG. 11 provides an example table illustrating example performance on the dataset XQuAD, according to one embodiment described herein.
FIG. 12 provides an example table showing example performance comparison of the code-mixed adversarial training and baseline methods, according to one embodiment described herein.
FIG. 13 provides example visualization of the encoder vector in the multilingual models trained by the code-mixed adversarial training, according to one embodiment described herein.

In addition to generating more fluent sentences (as shown in FIG. 9), extracting the candidate perturbations directly from the translations does away with the need for sense disambiguation and increases the number of perturbations per example since it is not limited to a static dictionary. The increased effectiveness of BUMBLEBEE compared to POLYGLOSS (1.13×) is further evidence that a key factor to the success of such adversarial attacks is the availability of sufficient candidates; increasing the dimensionality of the search space in-creases the probability that an adversarial example for the model exists FIG. 11 provides an example table illustrating example performance on the dataset XQuAD. It is observed that both XLM-R and mBERT are significantly challenged by BUMBLE-BEE even though only the question was modified.

As expected, inspection of individual adversarial examples revealed that BUMBLEBEE generated more natural sentences than POLYGLOSS since the languages used within phrases were more consistent (as shown in FIG. 9). However, incorrect alignments due to the word aligner's probabilistic nature could introduce occasional noise into the adversarial examples. For example, the article "the" (English) is often aligned with a Chinese word that is a possessive. The aligner performs better when the sentences have similar word orders (e.g., English-French vs. English-Chinese) and it is expected that the adversaries generated in these settings to be more natural. Hence, POLYGLOSS is recommended when greater preservation of word-level semantics is desired, and BUMBLEBEE is recommended when phrase-level perturbations are desired or bilingual dictionaries are unavailable.

Experiments of code-mixed adversarial training are performed on NLI with XLM-Rbase with no loss of generality. The multilingual model was trained for ten epochs. Hence, the parameters are set as: $k=9$, $n=2$, $\pi=0.5$ for CAT and train all models for a similar number of steps (60k) with the same hyperparameters. The models are first tested on the BUMBLEBEE adversaries generated from FIG. 9 before directly attacking the model. Next, more realistic settings are constructed by running BUM-BLEBEE with only 1-2 embedded languages from standard XNLI, Swahili (sw), Hindi (hi), and Urdu (ur). These languages were the lowest resourced in the pretraining data.

Another non-adversarial test set is also constructed from XNLI by randomly choosing hypotheses and premises from different languages. Since the original examples are individually monolingual, this test set may reveal if a model is simply exploiting lexical overlap rather than com-paring the underlying concepts. Next, BUMBLEBEE may be run with embedded languages not seen during task-specific training and from a different family (Austronesian) from the XNLI languages, Filipino (tl) and Indonesian (id). This zero-shot defense setting may reveal if CAT encourages the learning of more language-invariant representations, or is simply allowing the model to adapt to the adversarial distribution.

Baselines models for comparison include a translate-train-n baseline. In this setting, every x and its translations in the n languages exampled in CAT are used, regardless of whether they contributed words to the final CAT examples. The domain adversarial neural network (DANN) is used for cross-lingual adaptation. Further details of the DANN can be found in Ganin et al., Domain-adversarial training of neural net-works, Journal of Machine Learning Research, 17(1): 2096-2030, 2016.

FIG. 12 provides an example table showing example performance comparison of the code-mixed adversarial training and baseline methods, according to one embodiment described herein. From FIG. 12, it is observed that both training on fully translated data and on CAT examples improved accuracy on the non-adversarial test sets and robustness to code-mixed adversaries, compared to the cross-lingual transfer model that was only trained on English data.

Disrupting the models' reliance on lexical overlap (CleanDL) hurt performance. The drop was particularly significant for the cross-lingual transfer (8 points) and translate-train-n models (5.24 points). On the other hand, the CAT model only suffered a 1.5-point drop, indicating that the former two models likely rely heavily on lexical overlap to make predictions, while the CAT model may be using "deeper", more language-agnostic features. The CAT model is >1.7× more robust to adversaries constructed from all fifteen XNLI languages than the translate-train-n model. Although DANN-type training improved robustness to the previous BUMBLEBEE adversaries, clean performance was significantly degraded and BUMBLEBEE was able to find even more damaging adversaries upon attacking the model directly.

When attacked with 1-2 embedded languages that were seen during training, CAT also yields significant improvements in robustness over the base-lines: a >7 point increase compared to translate-train-n and a >19 point gain over the zero-shot transfer setting. In the zero-shot defense setting, CAT shows a >12-point gain over the zero-shot transfer model and a >4.7-point gain over the translate-train-n model. The results may be due to CAT encouraging the learning of language-invariant representations by exposing the model to cross-lingual lexical variation and pre-venting the model from exploiting lexical overlaps.

To further understand the effect of various fine-tuning methods on XLM-Rbase, the <s> vector from the layer before the classification head is visualized using t-SNE, as shown in FIG. 13. Here, all sentences from XNLI are passed though the representations individually. If a representation were 100% language-invariant, t-SNE is expected to be unable to separate individual languages into their own clusters. Hence, the extent to which t-SNE is able to do so would indicate the amount of language-specific information in this last layer.

From FIG. 13.(a), for the cross-lingual transfer model, t-SNE managed to organize the sentences from several languages (Chinese, Hindi, Thai, Urdu) into distinct clusters. This indicates that a significant amount of language-specific information remains in the vector representations of sentences from these languages. Hence, while XLM-R may be multilingual, it appears to be structured as a space of individual language subspaces as opposed to a mixed, or language-invariant space. On the other hand, t-SNE was much less successful when given the representation trained with CAT (FIG. 13. (b)). Mixing multiple languages in the same sentence and showing the model multiple variants of the same sentence likely encourages the model to refine its representation such that all variants of the same sentence are represented similarly, resulting in a more language-invariant representation.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for code-mixed adversarial training of a neural network based multilingual model, the method comprising:
   receiving, by a communication interface, a training dataset of original matrix language examples and information of a set of embedded languages,
      wherein an original matrix language example in the training dataset corresponds with a respective label;
   constructing, by a processor, an adversarial distribution comprising adversarial probabilities corresponding to the set of embedded languages, wherein each adversarial probability corresponding to a respective embedded language is computed based on a number of perturbations per the respective embedded language by enumerating perturbations per the respective embedded language in successful adversaries of the training dataset;
   sampling, for an original matrix language example, a subset of embedded languages from the set of embedded language according to the adversarial distribution;
   translating the original matrix language example into a set of translated examples corresponding to the subset of embedded languages, respectively;
   sampling, from a plurality of language units in the set of translated examples, one or more language units in one or more embedded languages as one or more perturbations according to a pre-defined probability for a language unit in the original matrix language example;
   generating a code-mixed adversarial example by applying the one or more perturbations to the original matrix language example;
   generating an updated training dataset by combining the received training dataset with the generated code-mixed adversarial example;
   training the neural network based multilingual model based on the updated training dataset comprising at least an input of the generated code-mixed adversarial example and the respective label corresponding to the original matrix language example; and
   applying the trained neural network based multilingual model for a machine translation task that translates an input sentence in an original language into an output sentence in at least one of the set of embedded languages.

2. The method of claim 1, wherein the language unit is a word or a phrase comprising a sequence of words that have a designated meaning when recited as the sequence of words.

3. The method of claim 1, wherein the code-mixed adversarial example is a word-level adversarial example that is generated by:
   generating a set of candidate adversaries by substituting one or more words in the original matrix language example with one or more translated words in a translated example from the set of translated examples;
   computing a respective loss of the multilingual model by passing each candidate adversary from the set of candidate adversaries through the multilingual model and obtaining a respective output from the multilingual model in response to the respective candidate adversary;
   determining a specific candidate adversary that maximizes the respective loss based on a beam search on the set of candidate adversaries.

4. The method of claim 3, further comprising:
   filtering candidate perturbations by checking whether a respective candidate perturbation exists in the translated example.

5. The method of claim 1, wherein the code-mixed adversarial example is a phrase-level adversarial example that is generated by:
   aligning words in the original matrix language example to translated words in a translated example from the set of translated examples;
   identifying one or more phrases in the original matrix language example or the translated example based on the aligning;
   generating a set of candidate adversaries by substituting the one or more phrases in the original matrix language example with one or more counterpart phrases in the translated example from the set of translated examples;
   computing a respective loss of the multilingual model by passing each candidate adversary from the set of candidate adversaries through the multilingual model and obtaining a respective output from the multilingual model in response to the respective candidate adversary; and
   determining a specific candidate adversary that maximizes the respective loss based on a beam search on the set of candidate adversaries.

6. The method of claim 5, further comprising:
   applying an equivalence constraint that prevents a perturbation from being applied if the perturbation is from a same language as a previous word and disrupts a syntax of a current phrase.

7. The system of claim 1, wherein the code-mixed adversarial example is repeatedly generated for a first pre-defined number of times thereby resulting in a first pre-defined number of code-mixed adversarial examples corresponding to the original matrix language example.

8. The system of claim 7, wherein the first pre-defined number is set to be equal to a second pre-defined number associated with training epochs for the multilingual model minus one.

9. The system of claim 8, wherein the training of the multilingual model is performed using a set of generated code-mixed adversarial examples for one training epoch.

10. The method of claim 1, further comprising:
generating an adversarial attack example based on the original matrix language example and the set of embedded languages; and
testing an output robustness of the multilingual model using the adversarial attack example.

11. A system for code-mixed adversarial training of a neural network based multilingual model, the system comprising:
a memory that stores the neural network based multilingual model and a plurality of processor-executable instructions;
a communication interface that receives a training dataset of original matrix language examples and information of a set of embedded languages,
wherein an original matrix language example in the training dataset corresponds with a respective label; and
one or more hardware processors that execte the plurality of processor-executable instructions to:
construct an adversarial distribution comprising adversarial probabilities corresponding to the set of embedded languages, wherein each adversarial probability corresponding to a respective embedded language is computed based on a number of perturbations per the respective embedded language by enumerating perturbations per the respective embedded language in successful adversaries of the training dataset;
sample, for an original matrix language example, a subset of embedded languages from the set of embedded language according to the adversarial distribution;
translate the original matrix language example into a set of translated examples corresponding to the subset of embedded languages, respectively;
sample, from a plurality of language units in the set of translated examples, one or more language units in one or more embedded languages as one or more perturbations according to a pre-defined probability for a language unit in the original matrix language example;
generate a code-mixed adversarial example by applying the one or more perturbations to the original matrix language example;
generate an updated training dataset by combining the received training dataset with the generated code-mixed adversarial example;
train the neural network based multilingual model based on the updated training dataset comprising at least an input of the generated code-mixed adversarial example and the respective label corresponding to the original matrix language example; and
apply the trained neural network based multilingual model for a machine translation task that translates an input sentence in an original language into an output sentence in at least one of the set of embedded languages.

12. The system of claim 11, wherein the language unit is a word or a phrase comprising a sequence of words that have a designated meaning when recited as the sequence of words.

13. The system of claim 11, wherein the code-mixed adversarial example is a word-level adversarial example that is generated by:
generating a set of candidate adversaries by substituting one or more words in the original matrix language example with one or more translated words in a translated example from the set of translated examples;
computing a respective loss of the multilingual model by passing each candidate adversary from the set of candidate adversaries through the multilingual model and obtaining a respective output from the multilingual model in response to the respective candidate adversary;
determining a specific candidate adversary that maximizes the respective loss based on a beam search on the set of candidate adversaries.

14. The system of claim 13, wherein the one or more hardware processors further:
filters candidate perturbations by checking whether a respective candidate perturbation exists in the translated example.

15. The system of claim 11, wherein the code-mixed adversarial example is a phrase-level adversarial example that is generated by:
aligning words in the original matrix language example to translated words in a translated example from the set of translated examples;
identifying one or more phrases in the original matrix language example or the translated example based on the aligning;
generating a set of candidate adversaries by substituting the one or more phrases in the original matrix language example with one or more counterpart phrases in the translated example from the set of translated examples;
computing a respective loss of the multilingual model by passing each candidate adversary from the set of candidate adversaries through the multilingual model and obtaining a respective output from the multilingual model in response to the respective candidate adversary; and
determining a specific candidate adversary that maximizes the respective loss based on a beam search on the set of candidate adversaries.

16. The system of claim 15, wherein the one or more hardware processors further:
applies an equivalence constraint that prevents a perturbation from being applied if the perturbation is from a same language as a previous word and disrupts a syntax of a current phrase.

17. The system of claim 11, wherein the code-mixed adversarial example is repeatedly generated for a first pre-defined number of times thereby resulting in a first pre-defined number of code-mixed adversarial examples corresponding to the original matrix language example.

18. The system of claim 17, wherein the first pre-defined number is set to be equal to a second pre-defined number associated with training epochs for the multilingual model minus one.

19. The system of claim 18, wherein the training of the multilingual model is performed using a set of generated code-mixed adversarial examples for one training epoch.

20. A non-transitory processor-readable storage medium storing processor-executable instructions for code-mixed adversarial training of a neural network based multilingual model, the instructions being executed by a processor to perform operations comprising:

receiving a training dataset of original matrix language examples and information of a set of embedded languages,
   wherein an original matrix language example in the training dataset corresponds with a respective label;
constructing an adversarial distribution comprising adversarial probabilities corresponding to the set of embedded languages, wherein each adversarial probability corresponding to a respective embedded language is computed based on a number of perturbations per the respective embedded language by enumerating perturbations per the respective embedded language in successful adversaries of the training dataset;
sampling, for an original matrix language example, a subset of embedded languages from the set of embedded language according to the adversarial distribution;
translating the original matrix language example into a set of translated examples corresponding to the subset of embedded languages, respectively;
sampling, from a plurality of language units in the set of translated examples, one or more language units in one or more embedded languages as one or more perturbations according to a pre-defined probability for a language unit in the original matrix language example;
generating a code-mixed adversarial example by applying the one or more perturbations to the original matrix language example;
generating an updated training dataset by combining the received training dataset with the generated code-mixed adversarial example;
training the neural network based multilingual model based on the updated training dataset comprising at least an input of the generated code-mixed adversarial example and the respective label corresponding to the original matrix language example; and
applying the trained neural network based multilingual model for a machine translation task that translates an input sentence in an original language into an output sentence in at least one of the set of embedded languages.

* * * * *